(12) United States Patent
Amemiya (10) Patent No.: US 7,821,734 B2
(45) Date of Patent: Oct. 26, 2010

(54) HEAD IC, READ CIRCUIT AND MEDIUM STORAGE DEVICE

(75) Inventor: Yoshihiro Amemiya, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 325 days.

(21) Appl. No.: 11/998,113

(22) Filed: Nov. 28, 2007

(65) Prior Publication Data

US 2008/0123212 A1    May 29, 2008

(30) Foreign Application Priority Data

Nov. 29, 2006  (JP) ............................. 2006-321288

(51) Int. Cl.
*G11B 5/02*    (2006.01)
(52) U.S. Cl. ...................................... 360/67
(58) Field of Classification Search .................. None
See application file for complete search history.

(56) References Cited

U.S. PATENT DOCUMENTS

| | | | |
|---|---|---|---|
| 5,539,779 A | 7/1996 | Nagahori | |
| 5,576,906 A | 11/1996 | Fisher et al. | |
| 5,831,781 A | 11/1998 | Okamura | |
| 5,862,005 A | 1/1999 | Leis et al. | |
| 5,955,921 A * | 9/1999 | Ide et al. | 330/254 |
| 6,018,554 A | 1/2000 | Glover | |
| 6,452,990 B1 | 9/2002 | Leis et al. | |
| 6,618,215 B2 | 9/2003 | Fung et al. | |

| | | |
|---|---|---|
| 2008/0100944 A1 | 5/2008 | Matsui et al. |
| 2008/0123212 A1 | 5/2008 | Amemiya |
| 2009/0141386 A1 | 6/2009 | Miura |
| 2009/0147408 A1 | 6/2009 | Yamasaki |

FOREIGN PATENT DOCUMENTS

| | | |
|---|---|---|
| JP | 53-27011 | 3/1978 |
| JP | 63-237205 | 10/1988 |
| JP | 64-062806 | 3/1989 |
| JP | 05-166198 | 7/1993 |
| JP | 07-006487 | 1/1995 |
| JP | 08-097349 | 4/1996 |
| JP | 09-139040 | 5/1997 |
| JP | 10-021647 | 1/1998 |
| JP | 10-507027 | 7/1998 |
| JP | 2000-187804 | 7/2000 |
| JP | 2001-093221 | 4/2001 |
| JP | 3926391 | 6/2007 |
| WO | WO 97/16010 | 5/1997 |

* cited by examiner

*Primary Examiner*—Daniell L Negrón
(74) *Attorney, Agent, or Firm*—Greer, Burns & Crain, Ltd.

(57) ABSTRACT

A head IC adjusts an amplitude level of a read signal of a head to adjust dispersion of the output characteristic of the head and to adjust the read signal within the input dynamic range of the AGC of a read channel. An AGC amplifier is installed in a head IC connected to a read channel and a feedback response speed of an AGC circuit of the head IC is set to be sufficiently slower than a feedback response speed of an AGC circuit of the read channel. Also a peak hold circuit and an amplitude limiting circuit are installed in the head IC, and gain is adjusted with a holding value of the peak hold circuit. An initial gain can therefore be stably adjusted at high-speed without being influenced by signals having a small amplitude on the medium.

20 Claims, 10 Drawing Sheets

117
PHASE SERVO 130

FIG.3

ERASE SECTION | DATA SECTION (SERVO SIGNAL SECTION) | ERASE SECTION

HEAD IC, READ CIRCUIT AND MEDIUM STORAGE DEVICE

CROSS-REFERENCE TO RELATED APPLICATIONS

This application is based upon and claims the benefit of priority from the prior Japanese Patent Application No. 2006-321288, filed on Nov. 29, 2006, the entire contents of which are incorporated herein by reference.

BACKGROUND OF THE INVENTION

1. Field of the Invention

The present invention relates to a head IC, read circuit and medium storage device for adjusting an output level of a read signal from a head, and more particularly to a head IC, read circuit and medium storage device for adjusting the read signals from the head, of which output levels are different, to a predetermined level.

2. Description of the Related Art

In a medium storage device, such as a magnetic disk device, a head reads data from a medium. Recently as track densities increase, heads, of which sensitivity to detect magnetic flux of a medium is high, are being provided, where an MR (Magnetic Resistance) element is used for a read head. On the other hand, the use of a TuMR (or TMR) element utilizing the tunnel effect is under consideration as an element having even higher detection sensitivity.

However the output level of such read elements are not constant, and the characteristic change of the element caused by temperature change and fluctuation of floating amount also changes the output level. Therefore a circuit to adjust the output level of the read element before demodulating data is required.

Figure 11:
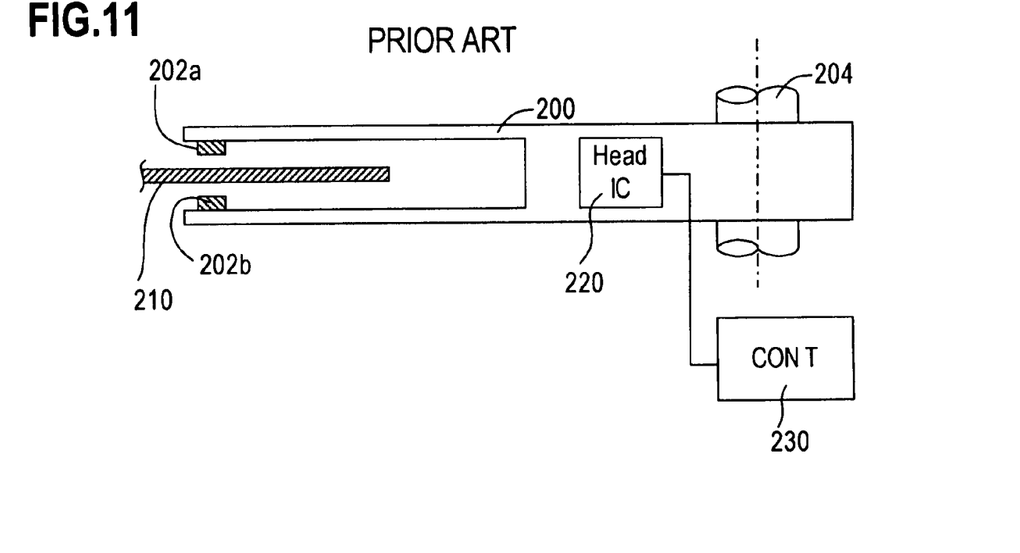
FIG. 11 is a diagram depicting a medium storage device of a prior art.
Figure 12:
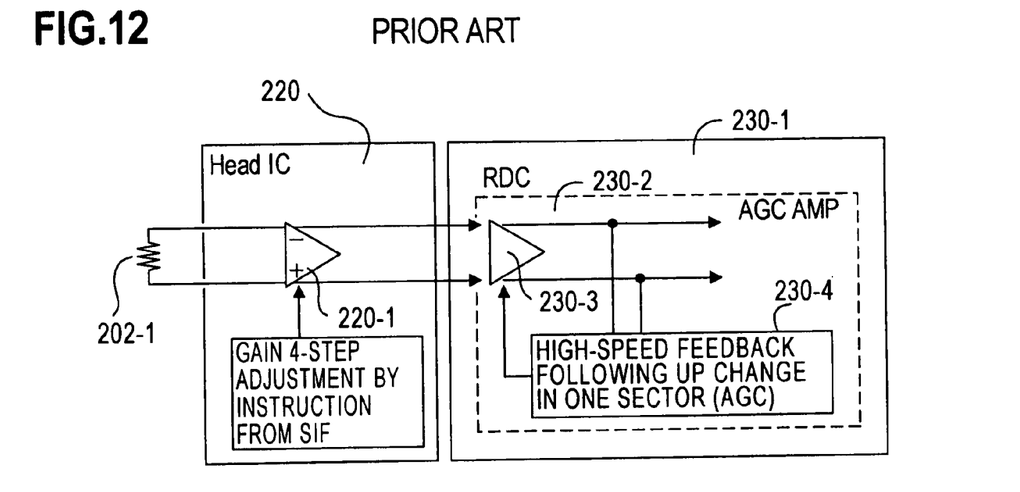
FIG. 12 is a diagram depicting a read circuit of a prior art.

FIG. 11 is a diagram depicting a configuration of a conventional medium storage device, and FIG. 12 is a block diagram depicting a conventional read circuit. As FIG. 11 shows, magnetic heads 202a and 202b, for reading data on a medium (magnetic disk) 210, are installed at the tip of an actuator 200.

The actuator 200 rotates on a rotation axis 204, and positions the magnetic heads 202a and 202b to a desired track on the magnetic disk 210. The magnetic heads 202a and 202b are connected to a head IC 220 installed in an actuator 200, and the head IC 220 is connected to a control circuit 230 outside the actuator 200.

The head IC 220 is installed between the magnetic heads 202a and 202b and the control circuit 230, so that the signal level is adjusted, since a distance from the magnetic heads 202a and 202b to the control circuit 230 is long, so the signal level from the magnetic heads 202a and 202b to the magnetic head may change, or noise may enter. This head IC 220 also integrates many signal lines between the magnetic heads and the control circuit, so as to simplify wiring. For example, the control circuit 230 and the head IC 220 are connected via a serial interface, and the head IC 220 and the magnetic heads 202a and 202b are connected by an individual signal line respectively.

FIG. 12 is a detailed diagram of the read system circuit in FIG. 11, where a variable gain amplifier (preamplifier) 220-1 is installed in the head IC 220 connected to a read element 202-1 of the magnetic head 202a (or 202b), so that the output of the read element 202 is amplified with a gain being set. A gain for each head is set for the variable gain amplifier 220-1.

In the control circuit 230 connected to the head IC 220, a read channel 230-1 is installed, and an AGC (Automatic Gain Control) amplifier 230-2 installed in the read channel 230-1 receives the output of the variable gain amplifier 220-1 of the head IC 220.

The AGC amplifier 230-2 is comprised of a differential amplifier 230-3 and an AGC circuit 230-4. The AGC circuit 230-4 compares an output value of the differential amplifier 230-3 and a reference output value, feeds back the comparison result, and adjusts a gain of the differential amplifier 230-3, thereby adjusting an output level of the differential amplifier 230-3 to a reference level (see Japanese Patent Application Laid-Open No. H10-021647, and Japanese Patent Application Laid-Open No. S64-062806).

This AGC circuit 230-4 sets high-speed feedback coefficients (frequency, gain change amount) for following up a change in one sector of a track of the magnetic disk 210, and equalizes the signal level in one sector.

In prior art, the fluctuation of the output level due to the characteristics of the element itself and the fluctuation of such environmental conditions as the floating amount are adjusted by the AGC amplifier of the read channel.

However along with the recent improvements in recording density, the use of a TuMR element, of which detection sensitivity is higher than the read element, is desired. The detection sensitivity of this read element having high detection sensitivity is about 10 times that of an MR element, but the dispersion of the signal output level is also high accordingly. Also the fluctuation of the signal level, due to temperature change and the fluctuation of the floating amount, is also high since the detection sensitivity is high.

If such a major fluctuation of a signal level occurs, it may be difficult to adjust this fluctuation by the AGC amplifier in the read channel.

Also because of improvements in recording density, circuit frequency is becoming higher, high speeds are demanded for the AGC amplifier of the read channel, and the input dynamic range of the AGC is becoming narrower. This makes it difficult to adjust level fluctuation by a change of the AGC amplifier of the read channel.

In this way, when a read element with high sensitivity is used or when an operation frequency of a circuit is increased to improve recording density, using the AGC of the read channel for adjusting the level fluctuation has limitations.

SUMMARY OF THE INVENTION

With the foregoing in view, it is an object of the present invention to provide a head IC, read circuit and medium storage device for stably adjusting the gain at start up, and automatically adjusting the output fluctuation of the head.

It is another object of the present invention to provide a head IC, read circuit and medium storage device for stably adjusting the gain at start up, and automatically adjusting the output fluctuation of the head even if dispersion of the head output level is dominant.

It is still another object of the present invention to provide a head IC, read circuit and medium storage device for stably adjusting the gain at start up, and automatically adjusting the output fluctuation of the head even if the input dynamic range of the AGC circuit of the read channel is narrow.

It is still another object of the present invention to provide a head IC, read circuit and medium storage device for stably adjusting the gain at start up, and automatically adjusting the output fluctuation of the head so as to implement high recording density.

To achieve these objects, a head IC of the present invention has: a differential amplifier for amplifying a read signal with a gain being set; an envelope circuit for detecting an output amplitude level of the differential amplifier; a gain error computing unit for computing a difference between the detected output amplitude level and a reference level; a feedback circuit which has a pull-in characteristic that is slower than a pull-in characteristic of the AGC amplifier of the read channel, and for automatically controlling a gain of the differential amplifier according to a gain error amount which is the difference; a peak hold circuit for holding a maximum value of the output amplitude level; and an amplitude limiting circuit for cutting an input of the output amplitude level which is smaller than the holding value of the peak hold circuit to the gain error computing unit according to the holding value, when the gain is initialized.

A read circuit of the present invention has: a head IC for adjusting an amplitude level of a read signal from the head; and a read channel which is connected to the head IC and has an AGC amplifier, wherein the head IC has: a differential amplifier for amplifying the read signal with a gain being set; an envelope circuit for detecting an output amplitude level of the differential amplifier; a gain error computing unit for computing a difference between the detected output amplitude level and a reference level; a feedback circuit which has a pull-in characteristic that is slower than a pull-in characteristic of the AGC amplifier of the read channel, and for automatically controlling a gain of the differential amplifier according to the gain error amount which is the difference; a peak hold circuit for holding a maximum value of the output amplitude level; and an amplitude limiting circuit for cutting an input of the output amplitude level which is smaller than the holding value of the peak hold circuit to the gain error computing unit according to the holding value, when the gain is initialized.

A medium storage device of the present invention has: a head for reading a medium; a head IC for adjusting an amplitude level of a read signal from the head; and a read channel which is connected to the IC and has an AGC amplifier, wherein the head IC has: a differential amplifier for amplifying the read signal with a gain being set; an envelope circuit for detecting an output amplitude level of the differential amplifier; a gain error computing unit for computing a difference between the detected output amplitude level and a reference level; a feedback circuit which has a pull-in characteristic that is slower than a pull-in characteristic of the AGC amplifier of the read channel, and for automatically controlling a gain of the differential amplifier according to the gain error amount which is the difference; a peak hold circuit for holding a maximum value of the output amplitude level; and an amplitude limiting circuit for cutting an input of the output amplitude level to be smaller than the holding value of the peak hold circuit to the gain error computing unit according to the holding value, when the gain is initialized.

In the present invention, it is preferable that the amplitude limiting circuit inputs the holding value of the peak hold circuit to the gain error computing unit when gain is initialized, and inputs the detected output amplitude level of the envelope circuit to the gain error computing unit after gain initialization is over.

It is also preferable that the present invention further has a comparison circuit for comparing a 1/N (N>1) value of the holding value of the peak hold circuit and the detected output amplitude level of the envelope circuit when the gain is initialized, and that the amplitude limiting circuit has a switch for inputting the output amplitude level to the gain error computing unit when the output amplitude level is greater than the 1/N value.

It is also preferable that the present invention further has: a memory for storing an initial value of the adjusted gain; and a sequence circuit for setting an initial value of a gain of the memory in the differential amplifier when pull-in starts.

In the present invention, it is also preferable that the sequence circuit sets a pull-in characteristic of the feedback circuit to be fast, instructs a gain of the AGC amplifier of the read channel to a fixed gain at start up, and sets the pull-in characteristic of the feedback circuit to a characteristic that is slower than the pull-in characteristic of the AGC amplifier of the read channel when the pull-in ends.

In the present invention, it is also preferable that the feedback circuit has: a low pass filter for cutting the high frequency component of the output of the difference from the gain error computing section; and a gain multiplier for multiplying an output of the low pass filter by a predetermined feedback gain, and controlling the gain of the differential amplifier.

It is also preferable that the present invention further has a head switching section for connecting one of a plurality of heads to the differential amplifier according to a head select signal, wherein the initial values of the gains of the plurality of heads are stored in the memory, and the sequence circuit sets the initial value of the gain corresponding to the connected head of the memory in the differential amplifier when the pull-in starts.

Since the AGC amplifier is installed in the head IC, amplitude from the head is automatically adjusted in the head IC, and signal levels can be adjusted so as to enter the input dynamic range of the AGC amplifier of the read channel. The AGC circuit of the read channel circuit has a relatively fast feedback response speed, and a feedback respond speed of the AGC circuit of the head IC, on the other hand, is set to be sufficiently slower than the feedback response speed of the AGC circuit of the read channel circuit, so the AGC circuit of the head IC does not influence the fast AGC operation of the AGC circuit of the read channel. Also the gain initial value of the head IC is set using the holding value of the peak hold circuit, so initial gain can be stably adjusted at high-speed without being influenced by signals having small amplitude on the medium.

DESCRIPTION OF THE PREFERRED EMBODIMENTS

Embodiments of the present invention will now be described in the sequence of the medium storage device, first embodiment, second embodiment and third embodiment of the read circuit, and other embodiments, but the present invention is not limited to these embodiments.

Medium Storage Device

Figure 1:
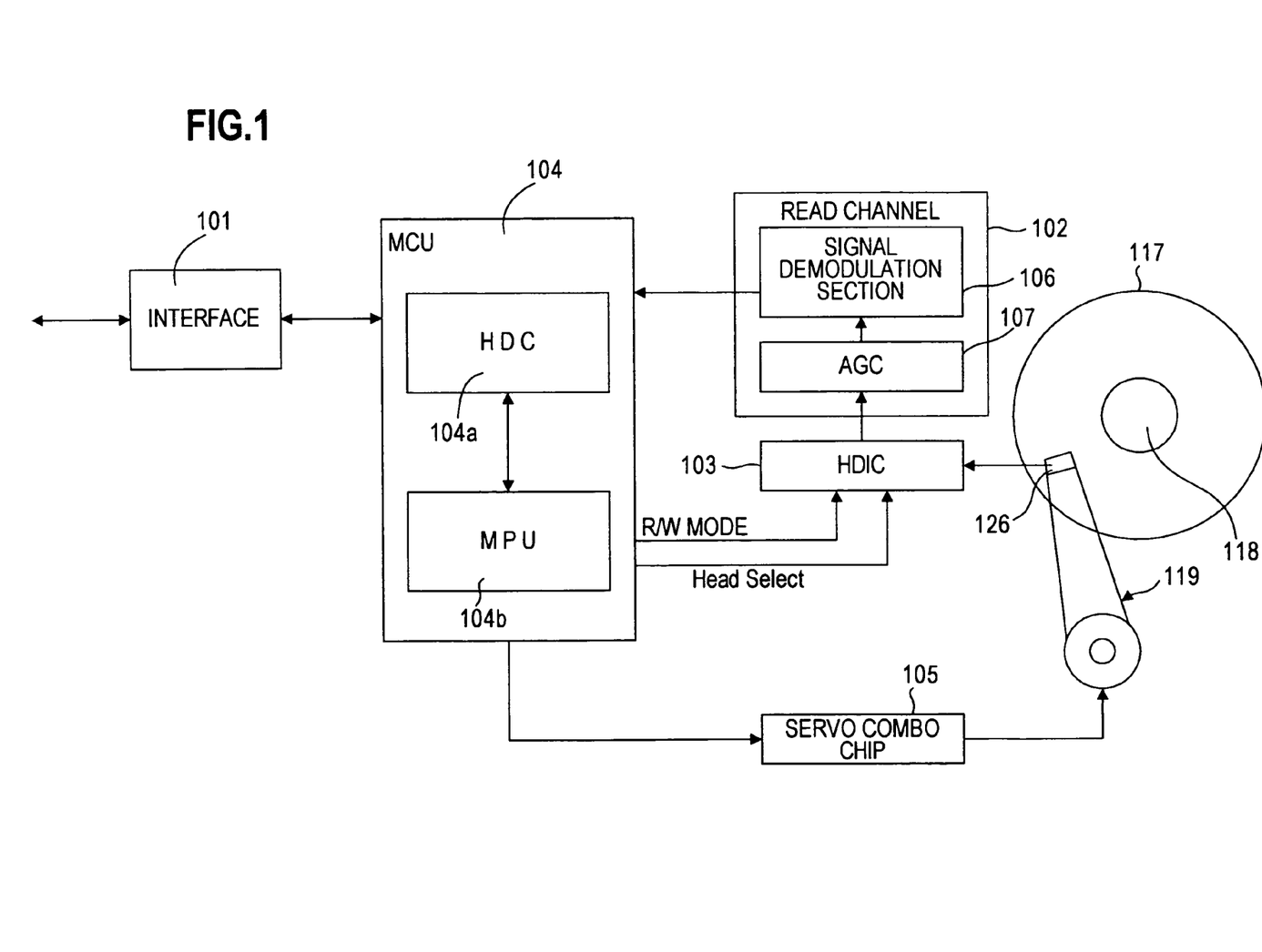
FIG. 1 is a block diagram depicting an embodiment of a medium storage device of the present invention.
Figure 2:
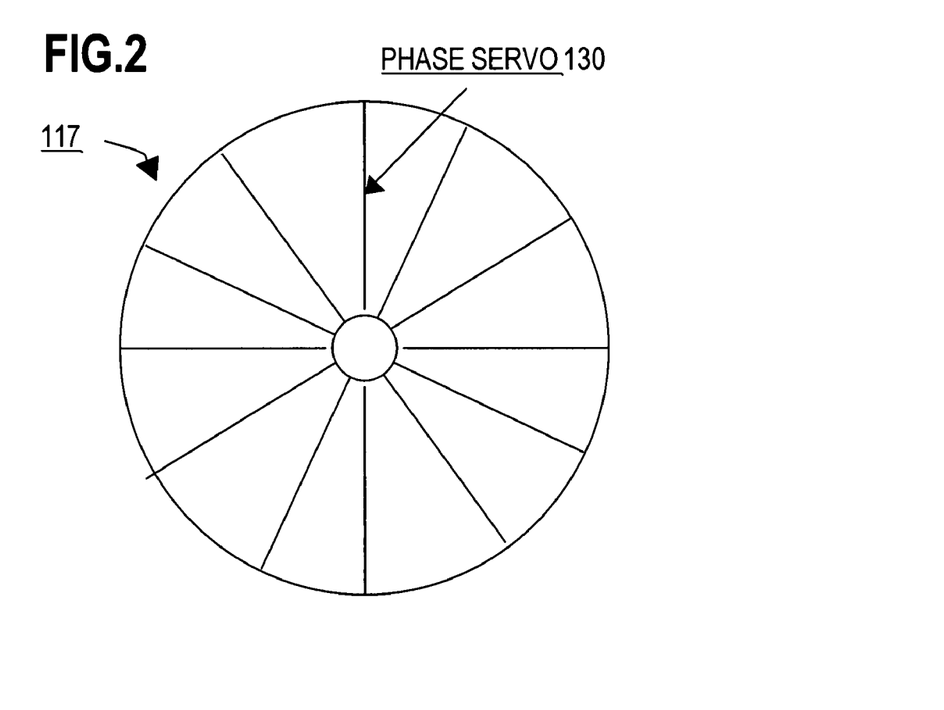
FIG. 2 is a diagram depicting the magnetic disk in FIG. 1.
Figure 3:
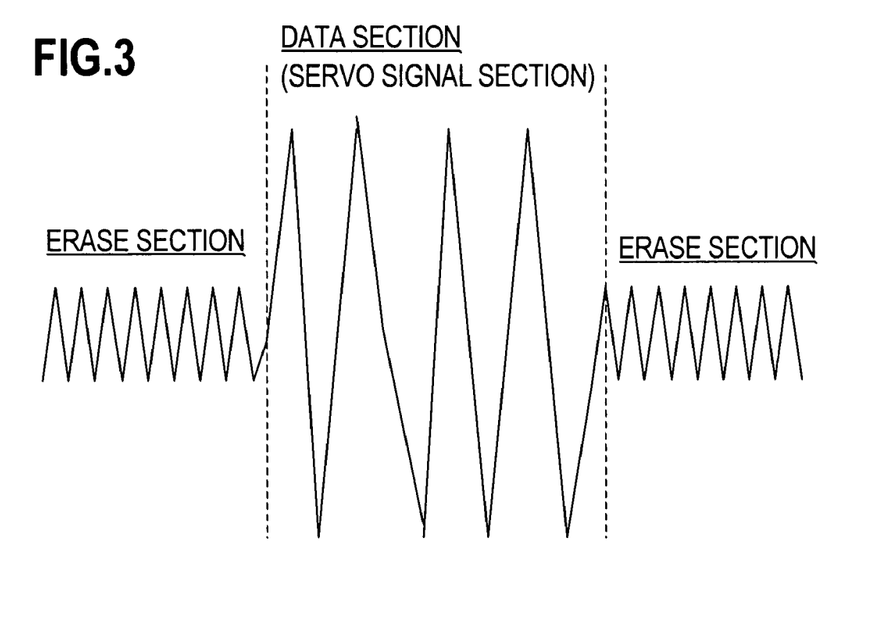
FIG. 3 is a diagram depicting a read waveform of the magnetic disk in FIG. 2.

FIG. 1 is a block diagram depicting a medium storage device according to an embodiment of the present invention, FIG. 2 is a diagram depicting a magnetic disk in FIG. 1, and FIG. 3 is a diagram depicting a read level of the magnetic disk in FIG. 2. FIG. 1 shows a magnetic disk device as a medium storage device.

As FIG. 1 shows, a magnetic disk 117, which is a magnetic storage medium, is installed on a rotation axis 118 of a spindle motor. The spindle motor rotates the magnetic disk 117. An actuator (VCM) 119 has a magnetic head 126 at the tip, and moves the magnetic head 126 in a radius direction of the magnetic disk 117.

The actuator 119 is comprised of a voice coil motor (VCM) which rotates on a rotation axis. When two magnetic disks 117 are installed on the magnetic disk device, four magnetic heads 126 for reading/writing the faces of each magnetic disk are simultaneously driven by the same actuator 119.

The magnetic head 126 is comprised of a read element and a write element. For example, the magnetic head 126 is comprised of read elements, including a tunnel effect magneto-resistance (TuMR) element stacked on a slider, and write elements, including a write coil stacked thereon.

A head IC 103 is installed on a side face of the actuator 119, as shown in FIG. 11, and is comprised of a read system circuit including an AGC amplifier, and a write system circuit, as described in FIG. 4 and later, and in the read mode, read signals from the read element of the magnetic head 126 are amplified and output, and in the write mode, a write drive current is supplied to the write element of the magnetic head 126.

A read channel 102 has a read system circuit and a write systems circuit, and the read system circuit is comprised of an AGC amplifier 107 and a signal demodulation circuit 106. A microcontroller (MCU) 104 is comprised of a hard disk controller (HDC) 104a and a microprocessor (MPU) 104b.

The hard disk controller (HDC) 104a analyzes a command, judges a position on a track based on a sector number of a servo signal, and controls the recording/reproducing of data, and also temporarily stores read data and write data. The MPU 104b controls each section.

A servo combo circuit 105 detects (demodulates) a current position from a servo position signal from the signal demodulation circuit 106, and computes a VCM drive command value of the actuator 119 according to an error between a detected current position and a target position. The servo combo circuit 105 also drives the spindle motor. An interface circuit 101 communicates with a host with such an interface as USB (Universal Serial Bus), ATA (Attached AT) or SCSI (Small Computer Systems Interface).

As FIG. 2 shows, servo signals (position signals) 130 are arranged in each track on the magnetic disk 117 in the circumference direction from the outer circumference to the inner circumference at an equal interval. Each track has a plurality of sectors, and servo signals 130 are recorded in each sector. A servo signal 130 is comprised of a servo mark, track number, index and offset information (servo burst) PosA, PosB, PosC and PosD.

This position signal (servo signal) 130 is read by the head 126, and the position of the magnetic head in the radius direction is detected using the track number and the offset information PosA, PosB, PosC and PosD. Also based on the index signal Index, the position of the magnetic head in the circumference direction is acquired.

To read such position signals and data, the level of the read output of the read element of the magnetic head 126 is adjusted by the head IC 103, and is adjusted to a predetermined level by the AGC circuit 107 of the read channel 102.

As FIG. 3 shows, in the initial state of the magnetic disk (in other words, state when data is not recorded), the magnetic disk 117 is erased and only servo signals 130 are recorded. This is because if the magnetizing state of the magnetic disk 117 is uniform, the servo signals 117 may not be written correctly at high-speed.

For example, when the magnetic disk is a perpendicular recording medium, servo signals are written after AC-erasing the magnetic disk by a servo track writer. In AC-erase processing, the magnetic disk is not completely demagnetized, but signals corresponding to the maximum frequency used for a magnetic disk device are written. Therefore the signal level of this erase area is small.

If this erase processing is not performed, a strong magnetic field may be generated between the tracks of the user data area depending on the magnetizing state, and this magnetic field could influence the write head and interfere with normal writing, and for reading as well, this magnetic field could generate positive or negative bias in the read signal level, and accurate reading cannot be implemented.

In the case of a perpendicular recording medium, AC (Alternating Current) erase, instead of DC (Direct Current) erase, is used because of adjacent magnetization and substrate erase. In the case of a horizontal recording medium, DC erase is used. The recording density of servo signal is low, and signal amplitude thereof is high.

In the case of using an erase-processed recording medium, if the gain of the level adjustment circuit of the head IC is adjusted based on the read signal of the head at start up, the read signal of the head is unreliable at start up, so it cannot be recognized how signal (servo signal or signal of erase section) is input to the head.

Therefore if gain is adjusted simply based on the read signal of the head, gain is adjusted using the servo signal and the signal of the erase section in FIG. 3, and initial gain does not easily converge, and as a result, it may take time to determine the initial gain, and accuracy may drop as well.

Therefore according to the present invention, the gain of the level adjustment circuit of the head IC is adjusted by the servo signals without being influenced by the signals of the erase section, as described later. By this, the time for gain adjustment can be decreased, and the accuracy of the determined gain can be improved.

First Embodiment of Read Circuit

Figure 4:
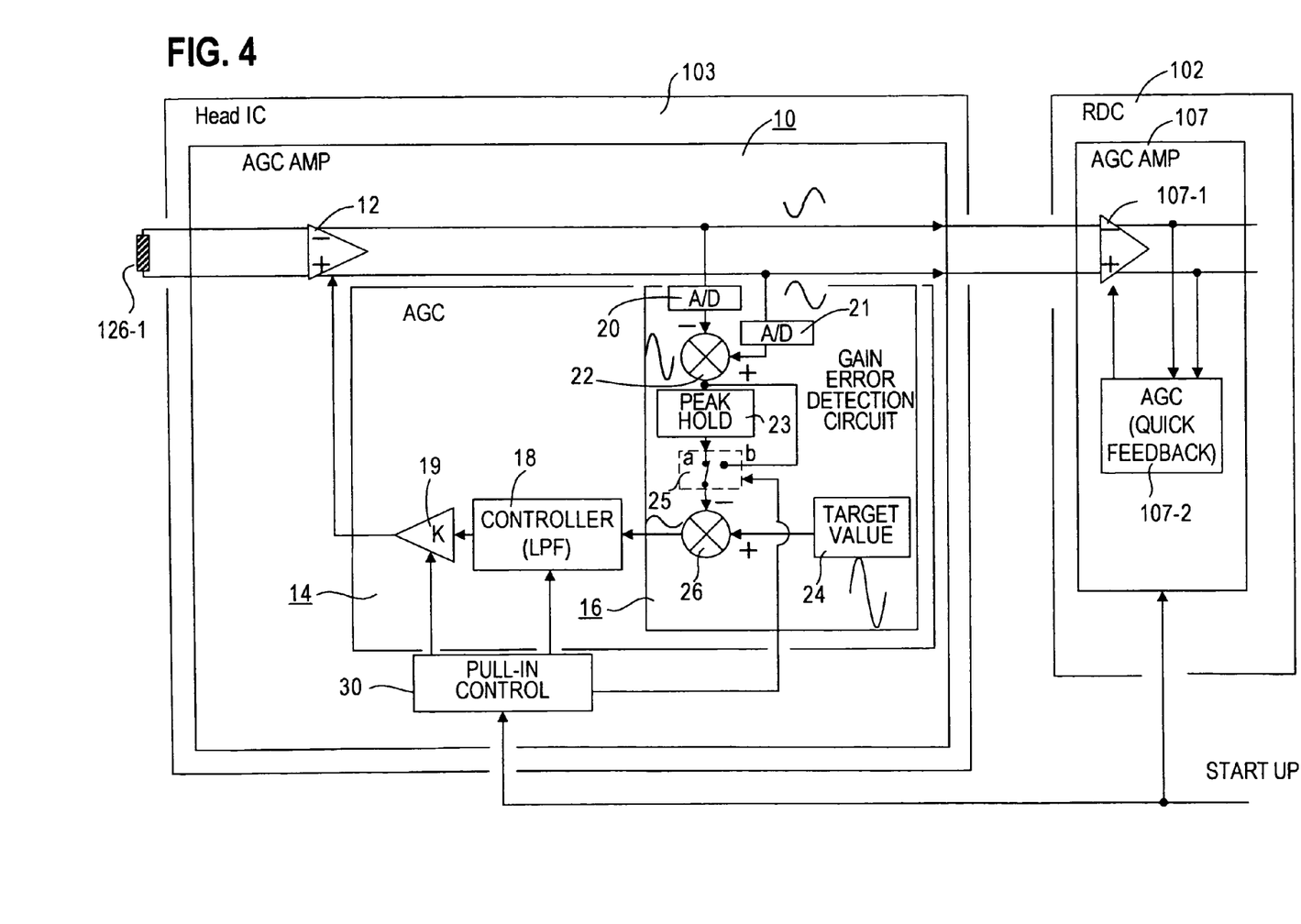
FIG. 4 is a circuit diagram depicting a first embodiment of the read circuit of the present invention.
Figure 5:
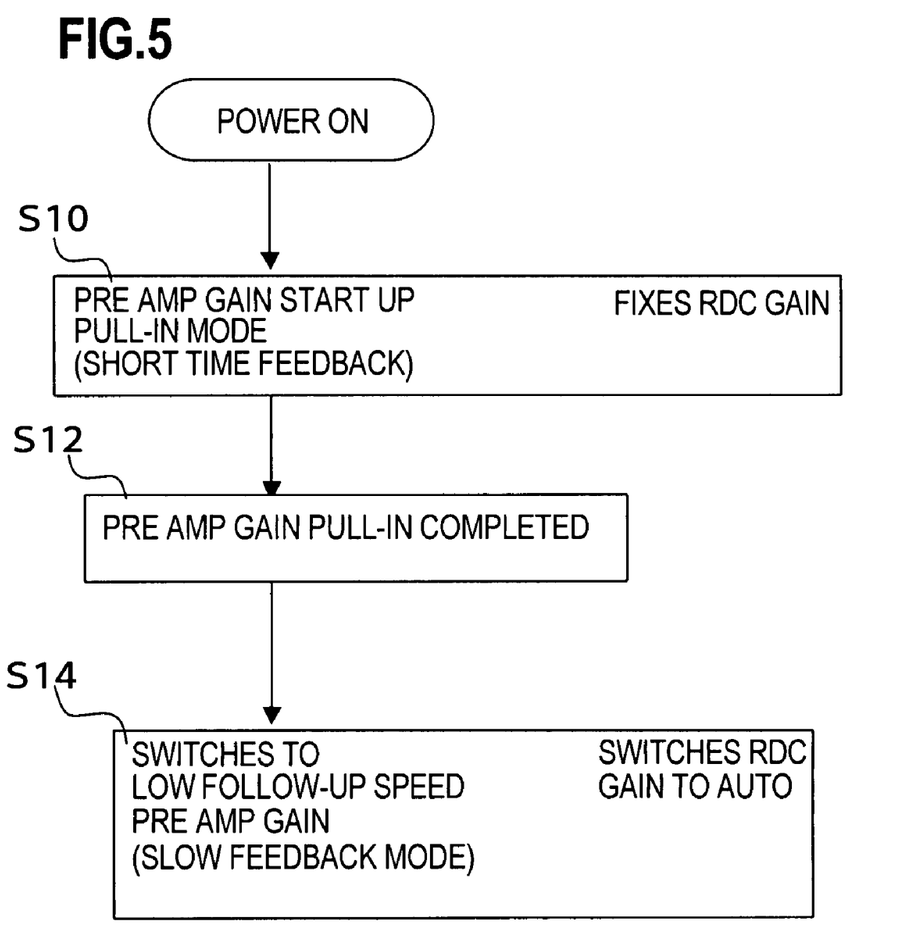
FIG. 5 is a diagram depicting a control sequence of the pull-in control circuit in FIG. 4.
Figure 6:
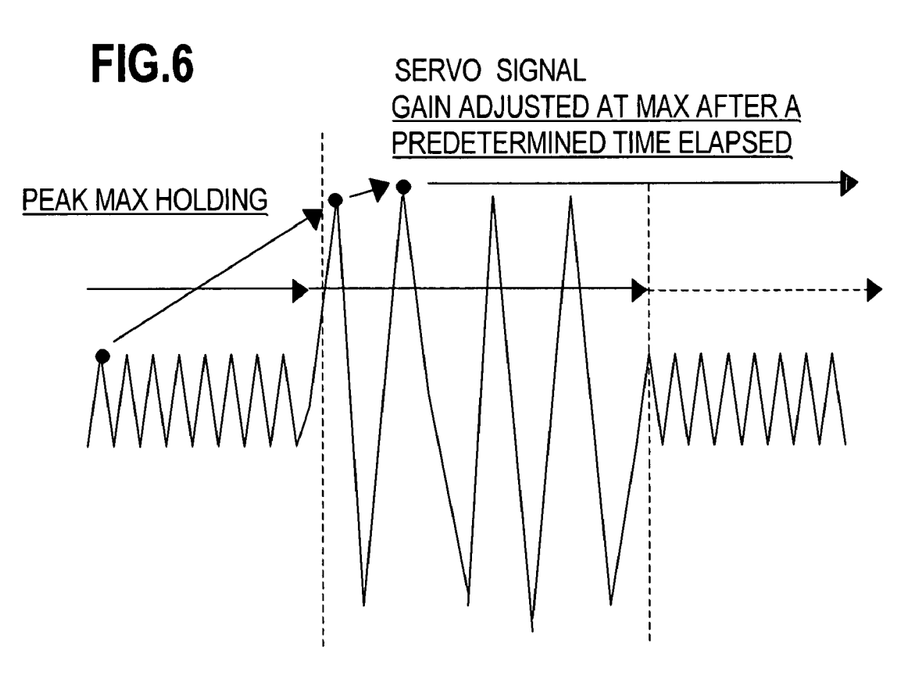
FIG. 6 is a diagram depicting the gain initial value adjustment operation in FIG. 4.
Figure 7:
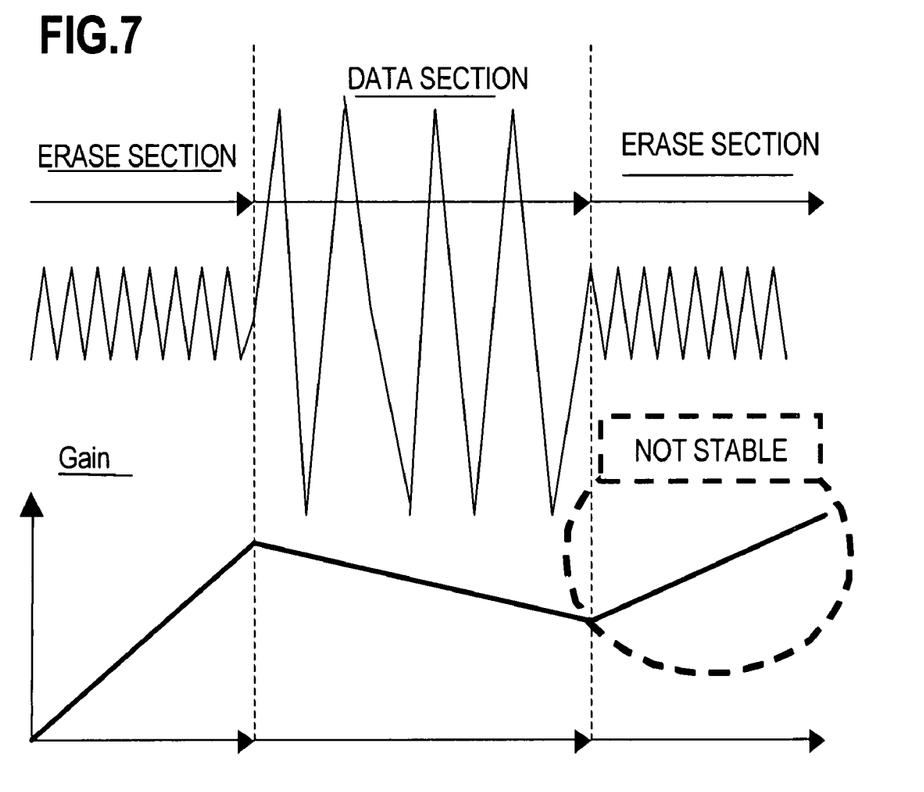
FIG. 7 is a diagram depicting a problem of adjusting the gain initial value in FIG. 4.

FIG. 4 is a circuit diagram depicting a first embodiment of the read circuit of the present invention, FIG. 5 is an operation sequence diagram thereof, FIG. 6 is a diagram depicting the gain initialization operation, and FIG. 7 is a diagram depicting a problem of gain initialization.

In FIG. 4, composing elements the same as FIG. 1 are denoted with the same reference symbols, and an AGC amplifier 10 is installed in a head IC 103. The AGC amplifier 10 is comprised of a differential amplifier 12 connected to both ends of a read element (TuMR element) 126-1, and an AGC circuit 14 for automatically controlling the gain of the differential amplifier 12.

The AGC circuit 14 is comprised of a gain error detection circuit 16, a feedback controller (low pass filter) 18, a gain multiplier 19 and a pull-in control circuit (sequence circuit) 30.

The gain error detection circuit 16 has a first A/D converter 20 for analog/digital converting the minus side voltage of the differential amplifier 12, a second A/D converter 21 for analog/digital converting the plus side voltage of the differential amplifier 12, and a first computing unit 22 for computing a difference of outputs of the A/D converters 20 and 21 to extract the amplitude (envelope extraction).

The gain error detection circuit 16 also has a maximum amplitude holding circuit (peak hold circuit) 23 for holding a peak of the extracted amplitude, a memory 24 for storing a target value (waveform) of the amplitude, a selector switch 25 (also referred to as amplitude limiting circuit) for selecting either the maximum amplitude value of the peak hold circuit 23 or an amplitude value detected by the first computing unit 22, and a second computing unit 26 for computing a difference between the target value of the amplitude in the memory 24 and the output amplitude value of the selector switch 25. This difference is the gain error.

The feedback controller 18 is comprised of a low pass filter, and is formed to be a loop so as to cut a high frequency component of the gain error signal and follow up to the gain error signal having low frequency. The gain multiplier 19 multiplies the output of the low pass filter 18 by K, which is a feedback gain, determines an amplification factor, and controls the gain of the differential amplifier 12. If the value of the feedback gain K is small, the feedback response speed is slow, and if the value of the feedback gain K is large, the feedback response speed is fast.

In a read channel circuit 102, on the other hand, an AGC amplifier 107, which is comprised of a differential amplifier 107-1 and an AGC circuit 107-2, is installed. The configuration of the AGC circuit 107-2 is a known configuration, and is comprised of a gain error detection circuit, feedback controller and gain multiplier. In other words, this is a form of the AGC circuit 14 of the head IC 103 from which the peak hold circuit 23 and the selector switch 25 are deleted, and description thereof is omitted.

The cut-off frequency of the low pass filter 18 of the AGC circuit 14 of this head IC 103 is set to be lower than the cut-off frequency of the low pass filter of the AGC circuit 107-2 of the read channel circuit 102, and the feedback gain K of the gain multiplier 19 of the AGC circuit 14 of the head IC 103 is set to be smaller than the feedback gain of the gain multiplier of the AGC circuit 107-2 of the read channel circuit 102.

By this, the feedback response speed of the AGC circuit 14 of the head IC 103 becomes slower than the feedback response speed of the AGC circuit 107-2 of the read channel circuit 102.

In other words, the AGC circuit 107-2 of the read channel circuit 102, which must adjust the output level within one sector, requires a relatively fast feedback response speed (high frequency and high feedback gain). The feedback response speed of the AGC circuit 14 of the head IC 103, on the other hand, is set to be sufficiently slower than the feedback response speed of the AGC circuit 107-2 of the read channel circuit 102. For example, the feedback response speed of the AGC circuit 14 of the head IC 103 is a feedback response speed with which amplitude change can be followed up only for about ten or more sectors.

The pull-in control circuit 30 sets the feedback response speed of the AGC circuit 14 of the head IC 103 to be fast when the initial gain is adjusted at start up, and sets the feedback speed of the AGC circuit 14 to be slow after the gain initial value is adjusted.

The operation of the AGC circuit according to the present embodiment will now be described with reference to FIG. 5, FIG. 6 and FIG. 7.

(S10) When the device is started up, the pull-in control circuit 30 sets a high cut-off frequency 'fh' to the low pass filter 18 of the AGC circuit 14 of the head IC 103, and a large gain value 'Kh' to the gain multiplier 19, and notifies the pull-in mode (FIX) at start up to the read channel 102. Therefore in the AGC circuit 14, the feedback response speed becomes fast and the AGC pull-in time becomes short. At this time, the AGC circuit 107-2 of the read channel 102 sets the gain of the differential amplifier 107-1 to the fixed gain according to the pull-in mode instruction, so contention of the AGCs can be prevented.

At the same time, the pull-in control circuit 30 switches the selector switch 25 to the "a" side. Therefore the second computing unit 26 computes a difference between a target value of the amplitude of the memory 24 and an output value of the peak hold circuit 23. This peak hold circuit 23 holds a maximum amplitude signal of the read signal of the head 126 of the magnetic disk 117, and the second computing unit 26 compares the maximum amplitude signal and the target value, and adjusts the gain.

As a consequence, even if the head 126 reads a data signal (servo signal) sandwiched by the signals of the erase sections described in FIG. 3, the peak hold circuit 23 holds the maximum value of the data signal, as shown in FIG. 6, and compares this maximum amplitude value, as the target of gain adjustment, with the target value in the short pull-in, and determines the gain, without being influenced by the signals of the erases sections having a small amplitude.

On the other hand, if the peak hold circuit is not used to determine the gain initial value, as shown in FIG. 7, the gain (signal amplification factor in FIG. 8) gradually increases in the signal of the erase section having a small amplitude before the signal of the data section, and decreases in the signal of the data section having a large amplitude, and gradually increases in the signal of the erase section having a small amplitude after the signal of the data section in the example of signals in FIG. 3.

In other words, the signal amplification factor (gain) is also adjusted in the erase sections, so it vertically fluctuates and does not easily converge. It takes a long time to stabilize the gain. Therefore the time to determine the initial gain increases, and the accuracy of the initial gain value is low. This means that after start up, the time required to enable normal reading from the start up becomes long, and starting operation at high-speed is difficult.

According to the present invention, the maximum amplitude value is held and the initial gain is determined with the maximum amplitude value, so the initial gain can be determined without being influenced by signals of the erase sections having small amplitude. This means that the time required for determining the initial gain can be decreased, and the accuracy of the value is also high.

(S12) The pull-in control circuit 30 judges whether the determination of the initial gain ended. A first method for this is setting a timer and judging the end of determination of the initial gain when a predetermined time is elapsed after start up. Another method is monitoring a gain error signal from the second computing unit 26, and judging whether the gain error signal converged (gain error signal value became "0" or roughly became "0").

(S14) When the pull-in control circuit 30 judges that the initial gain is determined, the pull-in control circuit 30 sets the cut-off frequency of the low pass filter 18 of the AGC circuit 14 of the head IC 103 to a low frequency 'fl', and sets the gain K of the gain multiplier 19 to a small gain value 'Kl'. Then the pull-in control circuit 30 switches the selector switch 25 to the "b" side so as to switch the input to the second computing unit 26 to the output of the first computing unit 22. Then the pull-in control circuit 30 notifies the end of the start up mode to the read channel 102. By this, the AGC circuit 107-2 of the read channel 102 starts automatic control of the gain of the differential amplifier.

For this, the cut-off frequency of the low pass filter 18 of the AGC circuit 14 of the head IC 103 is set to be lower than the cut-off frequency of the low pass filter of the AGC circuit 107-2 of the read channel circuit 102, and the feedback gain K of the gain multiplier 19 of the AGC circuit 14 of the head IC 103 is set to be smaller than the feedback gain of the gain multiplier of the AGC circuit 107-2 of the read channel circuit 102.

Because of this, the feedback response speed of the AGC circuit 14 of the head IC 103 is set to be slower than the feedback response speed of the AGC circuit 107-2 of the read channel circuit 102.

The read operation after the gain is determined will now be described. First the voltages of both ends of the read element 126-1 are input to the differential amplifier 12 of the head IC 103, which outputs a pair of differential amplification signals. The pair of differential amplification signals are input to the differential amplifier 107-1 of the AGC amplifier 107 of the read channel circuit 102.

In the AGC circuit 14 of the AGC amplifier 10, the first and second A/D converters 20 and 21 perform analog/digital conversion of a minus side voltage and a plus side voltage of the differential amplifier 12 respectively, and the first computing unit 22 computes the difference of the outputs of the A/D converters 20 and 21 to extract the amplitude.

Then the second computing unit 26 computes the difference of the target value of the amplitude in the memory 24 for storing the target value (waveform) of the amplitude and the amplitude detected by the first computing unit 22, and outputs the gain (amplification factor) error. The low pass filter 18 cuts a high frequency component of the gain error signal with the cut-off frequency being set, and extracts the gain error signal with low frequency. The gain multiplier 19 multiplies the output of the low pass filter 18 by K, which is a feedback gain, to determine the amplification factor, and controls the gain of the differential amplifier 12.

In the same way, the AGC circuit 107-2 of the read channel 102 also detects a gain error signal from a pair of the differential amplification signals of the differential amplifier 107-1, determines an amplification factor via the low pass filter and the gain multiplier, and controls the gain of the differential amplifier 107-1.

In this way, the AGC amplifier 10 is installed in the head IC 103 so as to automatically adjust amplitude from the head 126-1 in the head IC 103, thereby a signal level which enters the input dynamic range of the AGC amplifier 107 of the read channel 102 can be adjusted.

If two AGC circuits are operated simultaneously, an oscillation state may be generated because of the contention of the AGCs, and it takes a long time for pull-in of the AGCs. According to the present invention, however, the AGC circuit 107-2 of the read channel circuit 102 has a relatively fast feedback response speed (high frequency and high feedback gain) because of a restriction in which the output level must be adjusted within one sector, and the feedback response speed of the AGC circuit 14 of the head IC 103, on the other hand, is set to be sufficiently slower than the feedback response speed of the AGC circuit 107-2 of the read channel circuit 102 (e.g. feedback response speed with which only an amplitude change can be followed up for about ten or more sectors).

Therefore the AGC circuit 14 of the head IC 103 does not influence the fast AGC operation of the AGC circuit 107-2 of the read channel 102. In other words, the AGC circuit 14 of the head IC 103 does not follow up the fast amplitude change, which is the target of the amplitude adjustment of the AGC circuit 107-2 of the read channel 102, but follows up the slow amplitude change. Therefore even if two AGC circuits are installed, no contention occurs between the AGC circuits. As a result, an increase in AGC pull-in time caused by the oscillation state can be prevented.

Also in the embodiment, automatic level adjustment is performed in the head IC, so extra signal lines to the outside are not required. Therefore, as described in FIG. 11, this head IC is suitable to be mounted on the actuator.

If an AGC circuit is installed in both the head IC 103 and the read channel circuit 102, the pull-in of the AGC circuit of the head IC 103 must be performed before the pull-in of the AGC circuit of the read channel circuit 102. In order to decrease the pull-in completion time of the head IC 103, the initial gain is determined from the signal of the medium in an early stage, so the maximum amplitude value of the read signal is held only when the initial gain is set, so that the initial gain is determined using the maximum amplitude value. Therefore the initial gain can be determined without being influenced by the signals of the erase sections having small amplitude. As a consequence, the time required for determining the initial gain can be decreased, and the accuracy of the value is high.

Second Embodiment of Read Circuit

Figure 8:
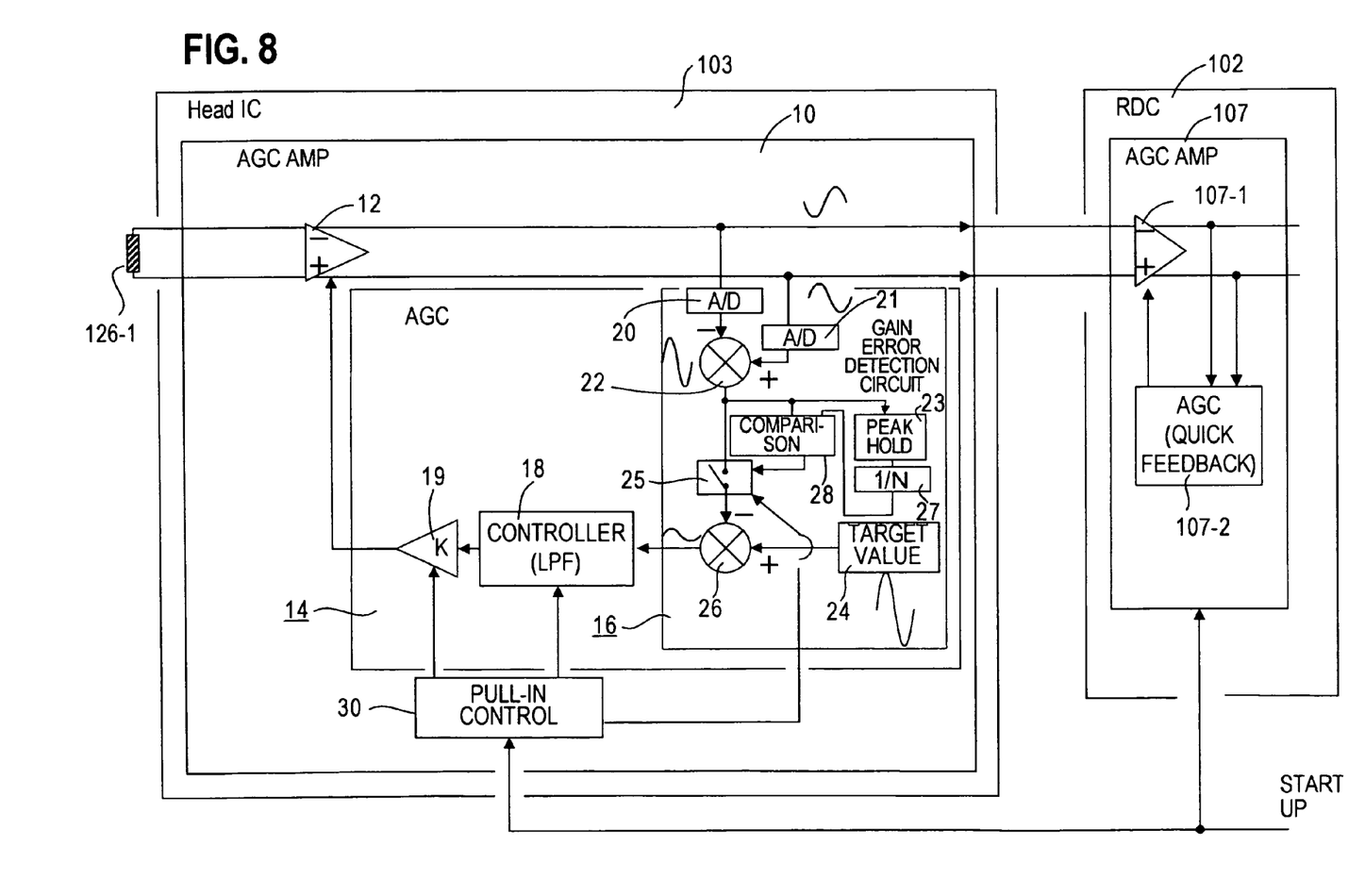
FIG. 8 is a circuit diagram depicting a second embodiment of the read circuit of the present invention.
Figure 9:
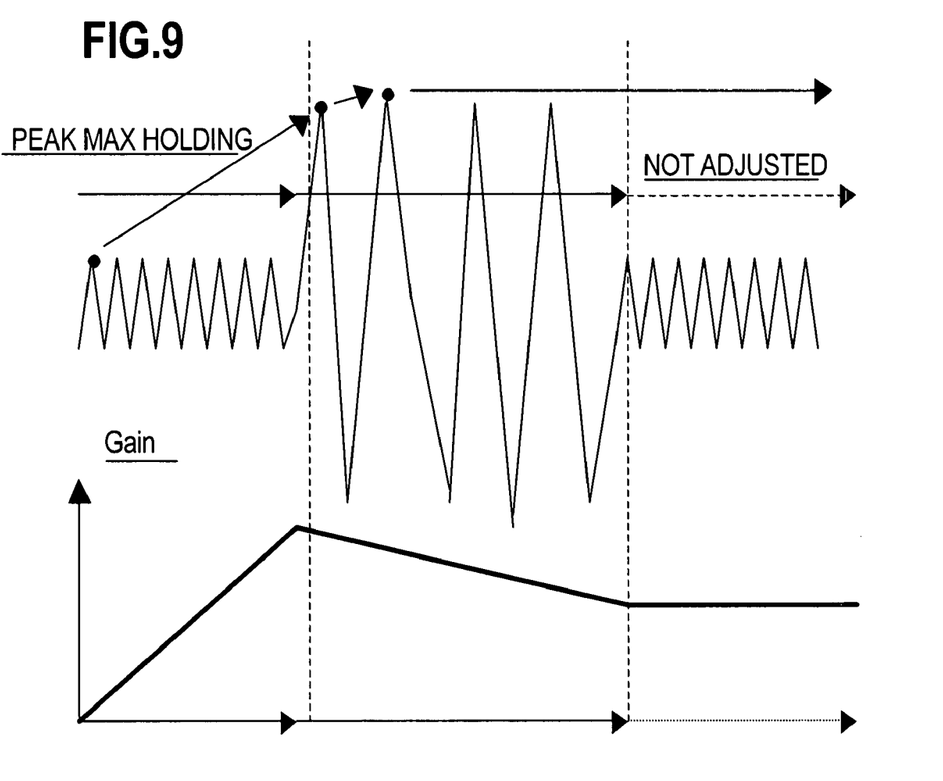
FIG. 9 is a diagram depicting the gain initial value adjustment operation in FIG. 8.

FIG. 8 is a circuit diagram depicting a second embodiment of the read circuit of the present invention, and FIG. 9 is an operation diagram thereof. In FIG. 8, composing elements the same as those in FIG. 1 to FIG. 4 are denoted with the same reference symbols.

In the head IC 103, an AGC amplifier 10 is installed. The AGC amplifier 10 is comprised of a differential amplifier 12 connected to both ends of a read element (TuMR element) 126-1, and an AGC circuit 14 for automatically controlling the gain of the differential amplifier 12.

The AGC circuit 14 is comprised of a gain error detection circuit 16, a feedback controller (low pass filter) 18, a gain multiplier 19, and a pull-in control circuit (sequence circuit) 30.

The gain error detection circuit 16 has a first A/D converter 20 for analog/digital converting a minus side voltage of a differential amplifier 12, a second A/D converter 21 for analog/digital converting a plus side voltage of the differential amplifier 12, and a first computing unit 22 for computing a difference of the outputs of the A/D converters 20 and 21 to extract amplitude (envelope extraction).

The gain error detection circuit 16 also has a maximum amplitude holding circuit (peak hold circuit) 23 for holding a peak of the extracted amplitude, a memory 24 for storing a target value (waveform) of the amplitude, a third computing unit 27 for computing 1/N (N>1) of the maximum amplitude value of the peak hold circuit 23, a switch 25 (also referred to as an amplitude limiting circuit) for selectively inputting an amplitude value detected by the first computing unit 22 to a second computing unit 26, a comparator 28 for comparing the computed value of the third computing unit 27 and the computed value of the first computing unit 22, and turning the switch 25 ON when the computed value of the first computing unit 22 is greater than the computed value of the third computing unit 27, and the second computing unit 26 for computing the difference between the target value of the amplitude in the memory 24 and the output amplitude value of the switch 25. This difference is the gain error.

The feedback controller 18 is comprised of a low pass filter, and is formed to be a loop so as to cut a high frequency component of the gain error signal, and follow up the gain error signal having low frequency. The gain multiplier 19 multiplies the output of the low pass filter 18 by K, which is a feedback gain, determines an amplification factor, and controls the gain of the differential amplifier 12. If the value of the feedback gain K is small, the feedback response speed is slow, and if the value of the feedback gain K is large, the feedback response speed is fast.

In the read channel circuit 102, on the other hand, an AGC amplifier 107, which is comprised of a differential amplifier 107-1 and an AGC circuit 107-2, is installed. The configuration of the AGC circuit 107-2 is a known configuration, and is comprised of a gain error detection circuit, feedback controller and gain multiplier. In other words, this is a form of the AGC circuit 14 of the head IC 103 from which the peak hold circuit 23, the third computing unit 27, the comparator 28 and the selector switch 25 are deleted, and description thereof is omitted.

The cut-off frequency of the low pass filter 18 of the AGC circuit 14 of this head IC 103 is set to be lower than the cut-off frequency of the low pass filter of the AGC circuit 107-2 of the read channel circuit 102, and the feedback gain K of the gain multiplier 19 of the AGC circuit 14 of the head IC 103 is set to be smaller than the feedback gain of the gain multiplier of the AGC circuit 107-2 of the read channel circuit 102.

In other words, the AGC circuit 107-2 of the read channel circuit 102, which must adjust the output level within one sector, requires a relatively fast feedback response speed (high frequency and high feedback gain). The feedback response speed of the AGC circuit 14 of the head IC 103, on the other hand, is set to be sufficiently slower than the feedback response speed of the AGC circuit 107-2 of the read channel circuit 102. For example, the feedback response speed of the AGC circuit 14 of the head IC 103 is a feedback response speed with which an amplitude change can be followed up only for about ten or more sectors.

The pull-in control circuit 30 sets the feedback response speed of the AGC circuit 14 of the head IC 103 to be fast when the initial gain is adjusted at start up, and sets the feedback speed of the AGC circuit 14 to be slow after the initial value of the gain is adjusted.

According to the present embodiment, a function to cut a signal amplitude value, which is 1/N of the maximum amplitude value or less from the gain adjustment, is added, considering the ratio of the maximum amplitude of the read signal (amplitude of servo signal waveform) and signal amplitude of the erase section, in order to judge the waveform of the erase section when a signal is pulled in.

In other words, the pull-in control circuit 30 controls the switch 25 to be ON all the time, except when adjusting the gain initial value, and to turn ON/OFF depending on the output of the comparison circuit 28 when the gain initial value is adjusted.

As described in FIG. 5, when the device is started up, the pull-in control circuit 30 sets a high cut-off frequency 'fh' to the low pass filter 18 of the AGC circuit 14 of the head IC 103, and a large gain value 'Kh' to the gain multiplier 19, and notifies the pull-in mode (FIX) at start up to the read channel 102. Therefore in the AGC circuit 14, the feedback response speed becomes fast, and the AGC pull-in time becomes short. At this time, the AGC circuit 107-2 of the read channel 102 sets the gain of the differential amplifier 107-1 to the fixed gain according to a pull-in mode instruction, so contention of the AGCs can be prevented.

At the same time, the pull-in control circuit 30 instructs the switch 25 to turn ON/OFF depending on the output of the comparison circuit 28. Therefore as FIG. 9 shows, the signal amplitude value of the first computing unit 22 is input to the peak hold circuit 23, and also the comparison circuit 28 turns the switch 25 ON if the signal amplitude value of the first computing unit 22 exceeds the 1/N value of the output value of the peak hold circuit 23.

Therefore if the signal amplitude value exceeds the 1/N value of the output value of the peak hold circuit 23, the signal amplitude value is input to the second computing unit 26, and the second computing unit 26 computes the difference, and outputs the gain error signal to adjust the gain.

As a consequence, even if the head 126 reads a data signal (servo signal) sandwiched by signals of the erase sections, described in FIG. 3, the peak hold circuit 23 holds the maximum value of the data signal, as shown in FIG. 9, then the signals of the subsequent erase sections having small amplitude are input to the second computing unit 26, so as not to be used for gain adjustment.

In other words, the data section (servo signal section) is judged by the peak hold circuit 23, third computing unit 27 and comparator 28, and gain is adjusted using the amplitude of the envelope circuit (second computing unit 22). As a result, initial gain can be adjusted without being influenced by the noise generated by the erase sections.

This 1/N can be freely set depending on the amplitudes of the erase sections and the data section, and when a signal is pulled in, the waveform of the erase section is judged and cut from the gain adjustment target.

Just like FIG. 5, the pull-in control circuit 30 leaves the switch 25 ON all the time after initial gain adjustment is completed, and sets the feedback response speed to slow.

In other words, the feedback response speed of the AGC circuit 14 of the head IC 103 is set to be slow to prevent contention, so the pull-in time increases at start up or when mode is switched. To prevent this, the gain initial value is determined in an early stage. Therefore even if the feedback response speed of the AGC circuit 14 is slowed down, the pull-in time can be decreased.

Third Embodiment of the Read Circuit

Figure 10:
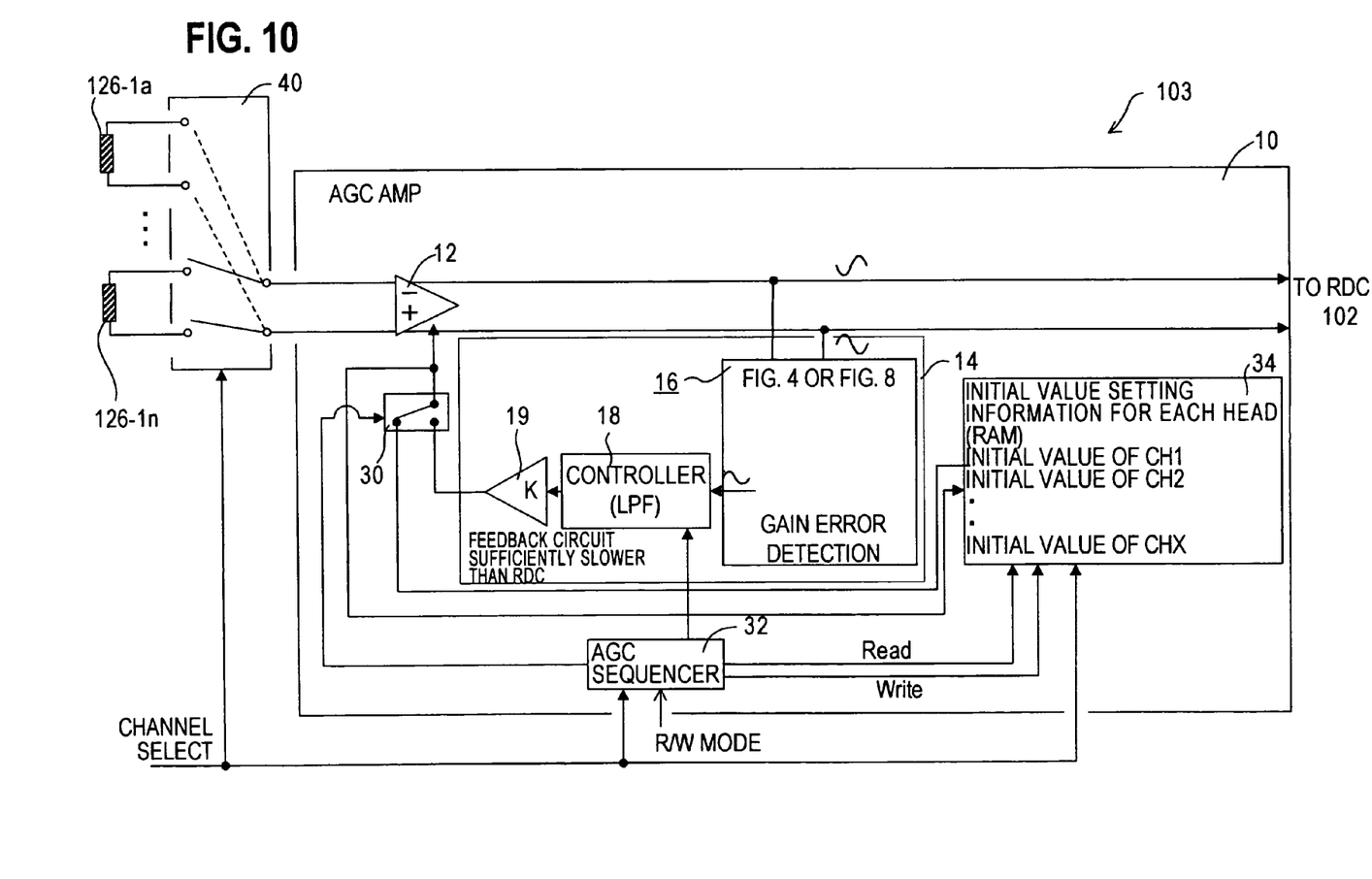
FIG. 10 is a circuit diagram depicting a third embodiment of a read circuit of the present invention.

FIG. 10 is a circuit diagram depicting a third embodiment of the read circuit of the present invention. In FIG. 10, composing elements the same as those in FIG. 1, FIG. 2, FIG. 3, FIG. 4 and FIG. 8 are denoted with the same reference symbols, and only the AGC amplifier 10 of the head IC 103 and the head switching circuit 40 are shown, and the read channel 102 is omitted. The configuration of the read channel 102 is the same as that in FIG. 4 and FIG. 8.

As FIG. 10 shows, single AGC amplifier 10 handles the signals of a plurality of read elements (TuMR elements) 126-1a to 126-1n. A head selector switch 40 switches the connection of the plurality of read elements 126-1a to 126-1n and a differential amplifier 12 by a channel (head) select signal.

The AGC amplifier 10 is comprised of the differential amplifier 12 connected to the head selector switch 40, an AGC circuit 14 for automatically controlling the gain of the differential amplifier 12, a memory 34, a selector switch 30 (also referred to as an amplitude limiting circuit), and an AGC sequencer (sequence circuit) 32. The AGC circuit 14 has a gain error detection circuit 16, a feedback controller (low pass filter) 18 and a gain multiplier 19.

The gain error detector 16 has a configuration described in FIG. 4 or a configuration described in FIG. 8. The feedback controller 18 is comprised of a low pass filter, and is formed to be a loop so as to cut a high frequency component of the gain error signal, and follow up the gain error signal having low frequency. The gain multiplier 19 multiplies the output of the low pass filter 18 by K, which is a feedback gain, determines an amplification factor, and controls the gain of the differential amplifier 12.

In this embodiment as well, the cut-off frequency of the low pass filter 18 of the AGC circuit 14 of the head IC 103 is set to be lower than the cut-off frequency of the low pass filter of the AGC circuit 107-2 of the read channel circuit 102 in FIG. 2, and the feedback gain K of the gain multiplier 19 of the AGC circuit 14 of the head IC 103 is set to be smaller than the feedback gain of the gain multiplier of the AGC circuit 107-2 of the read channel circuit 102.

By this, the feedback response speed of the AGC circuit 14 of the head IC 103 is set to be slower than the feedback response speed of the AGC circuit 107-2 of the read channel circuit 102.

Also the memory (RAM) 34 for storing the gain initial value for each head, the switch 30, and the AGC sequencer 32 are installed. The AGC sequencer 32 performs the initial gain determination processing described in FIG. 4, FIG. 5 and FIG. 8 for each magnetic head 126-1a to 126-1n at start up (first time power is turned ON), writes the setting gain from the gain multiplier 19 after determination in the memory 34, and stores the gain initial value of the corresponding channel.

After this, when a read mode is instructed by a start up instruction signal, the AGC sequencer 32 reads the gain initial value in the memory 34. At this time, the head selector switch 40 is operated by the channel select signal, and the read element of the selected head is connected to the differential amplifier 12, and the channel number of the initial value to be read is instructed to the memory 34.

Therefore when the AGC sequencer 32 reads the initial value of the memory 34, the initial value of the channel (head) instructed by the channel select signal is read, and is set in the differential amplifier 12 via the switch 30. After reading, the AGC sequencer 32 switches the switch 30 to the AGC circuit 14 (that is, gain multiplier 19).

In this example as well, the feedback response speed of the AGC circuit 14 of the head IC 103 is set to be slow to prevent contention, so the pull-in time increases at start up or a mode is switched. To prevent this, the gain initial value is adjusted, as mentioned above, and is determined. Then the determined gain initial value is stored and initially set in the differential amplifier 12 when read is started or when a channel is switched. Therefore even if the feedback response speed of the AGC circuit 14 is slowed down, the pull-in time can be decreased.

Also a gain initial value according to the characteristic dispersion of each head (read element) is stored, so even if the feedback response speed of the AGC circuit 14 is slowed down, the pull-in time can be decreased, regardless the characteristics of an individual head.

Also a change of pull-in time due to the characteristics of the head and temperature change can be prevented. In this embodiment, the gain initial value is measured and written to the memory 34, as described above, the first time power is turned ON or before shipment at the factory.

Other Embodiments

In the above embodiments, the AGC circuit was described using the configuration in such drawings as FIG. 4, but another AGC circuit, such as an analog type AGC circuit and AGC circuit having a peak hold circuit and integration circuit may be used. Also an example of the read circuit of the head of the magnetic disk device was described, but the present invention can also be applied to a read circuit of other medium storage devices. The embodiments of FIG. 4 and FIG. 8 may be executed each time the head is switched.

Also the pull-in speed of the AGC circuit of the head IC, when the gain initial value is adjusted, is set to be faster than normal signal read time, so the gain initial value can be more quickly adjusted, but even if the pull-in speed of the AGC circuit of the head IC, when the gain initial value is adjusted, is set to be the same as that of a normal signal reading time, the convergence time of the gain can be decreased, as mentioned above, and this setting is also acceptable.

Also an example of adjusting [the initial gain] using the amplitude of a servo signal was described, but this is not limited to a servo signal, and if the data is recorded in the user area, the initial gain may be adjusted using the amplitude of this data, in other words, the initial gain may be adjusted using an amplitude of the area where a signal is recorded.

The present invention was described using embodiments, but the present invention can be modified in various ways, and these variant forms shall not be excluded from the scope of the present invention.

Since the AGC amplifier is installed in the head IC, amplitude from the head is automatically adjusted in the head IC, and signal levels can be adjusted so as to enter the input dynamic range of the AGC amplifier of the read channel. The AGC circuit of the read channel circuit has a relatively fast feedback response speed, and a feedback response speed of the head IC, on the other hand, is set to be sufficiently slower than the feedback response speed of the AGC circuit of the read channel circuit, so the AGC circuit of the AGC circuit of head IC does not influence the fast AGC operation of the AGC circuit of the read channel. Also the gain initial value of the head IC is set using the holding value of the peak hold circuit, so initial gain can be stably adjusted at high-speed, without being influenced by signals having a small amplitude on the medium.

What is claimed is:

1. A head IC for adjusting an amplitude level of a read signal from a head which reads a signal from a recording medium, and outputting the adjusted read signal to a read channel which has an AGC amplifier, comprising:
a differential amplifier for amplifying said read signal with a gain being set;
an envelope circuit for detecting an output amplitude level of said differential amplifier;
a gain error computing unit for computing a difference between said detected output amplitude level and a reference level;
a feedback circuit which has a pull-in characteristic that is slower than a pull-in characteristic of the AGC amplifier of said read channel, and for automatically controlling a gain of said differential amplifier according to a gain error amount which is said difference;
a peak hold circuit for holding a maximum value of said output amplitude level; and an amplitude limiting circuit for cutting an input of said output amplitude level which is smaller than said holding value of said peak hold circuit to said gain error computing unit according to said holding value, when said gain is initialized.

2. The head IC according to claim 1, wherein said amplitude limiting circuit comprises a switch for inputting said holding value of said peak hold circuit to said gain error computing unit when said gain is initialized, and for inputting said detected output amplitude level of said envelope circuit to said gain error computing unit after said gain initialization is over.

3. The head IC according to claim 1, further comprising:
a comparison circuit for comparing a 1/N (N>1) value of said holding value of said peak hold circuit and said detected output amplitude level of said envelope circuit when said gain is initialized,
wherein said amplitude limiting circuit comprises a switch for inputting said output amplitude level to said gain error computing unit if said output amplitude level is greater than said 1/N value.

4. The head IC according to claim 1, further comprises:
a memory for storing an initial value of said adjusted gain; and
a sequence circuit for setting an initial value of a gain of said memory in said differential amplifier when pull-in starts.

5. The head IC according to claim 4, further comprising a head switching section for connecting one of a plurality of heads to said differential amplifier according to a head select signal,
wherein said memory stores initial values of gains of said plurality of heads, and said sequence circuit sets the initial value of the gain corresponding to said connected head of said memory in said differential amplifier when said pull-in starts.

6. The head IC according to claim 1, further comprising a sequence circuit for setting a pull-in characteristic of said feedback circuit to be fast, and instructing a gain of the AGC amplifier of said read channel to a fixed gain at said start up, and setting the pull-in characteristic of said feedback circuit to a characteristic slower than the pull-in characteristic of the AGC amplifier of said read channel when said pull-in ends.

7. The head IC according to claim 1, wherein said feedback circuit comprises:
a low pass filter for cutting the high frequency component of the output of said difference from said gain error computing unit; and
a gain multiplier for multiplying an output of said low pass filter by a predetermined feedback gain, and controlling the gain of said differential amplifier.

8. A read circuit for adjusting an amplitude level of a read signal from a head which reads a signal from a medium, comprising:
a head IC for adjusting an amplitude level of a read signal from said head; and
a read channel which is connected to said head IC and has an AGC amplifier, wherein said head IC comprises:
a differential amplifier for amplifying said read signal with a gain being set;
an envelope circuit for detecting an output amplitude level of said differential amplifier;
a gain error computing unit for computing a difference between said detected output amplitude level and a reference level;
a feedback circuit which has a pull-in characteristic that is slower than a pull-in characteristic of the AGC amplifier of said read channel, and for automatically controlling a gain of said differential amplifier according to a gain error amount which is said difference;
a peak hold circuit for holding a maximum value of said output amplitude level; and
an amplitude limiting circuit for cutting an input of said output amplitude level which is smaller than said holding value of said peak hold circuit to said gain error computing unit according to said holding value, when said gain is initialized.

9. The read circuit according to claim 8, wherein said amplitude limiting circuit comprises a switch for inputting said holding value of said peak hold circuit to said gain error computing unit when said gain is initialized, and for inputting said detected output amplitude level of said envelope circuit to said gain error computing unit after said gain initialization is over.

10. The read circuit according to claim 8, further comprising:
a comparison circuit for comparing a 1/N (N>1) value of said holding value of said peak hold circuit and said detected output amplitude level of said envelope circuit when said gain is initialized,
wherein said amplitude limiting circuit comprises a switch for inputting said output amplitude level to said gain error computing unit if said output amplitude level is greater than said 1/N value.

11. The read circuit according to claim 8, wherein said head IC further comprises:
a memory for storing an initial value of said adjusted gain; and
a sequence circuit for setting an initial value of a gain of said memory to said differential amplifier when pull-in starts.

12. The read circuit according to claim 11, further comprising a head switching section for connecting one of a plurality of heads to said differential amplifier according to a head select signal,
wherein said memory stores initial values of gains of said plurality of heads, and said sequence circuit sets the initial value of the gain corresponding to said connected head of said memory in said differential amplifier when said pull-in starts.

13. The read circuit according to claim 8, further comprising a sequence circuit for setting a pull-in characteristic of said feedback circuit to be fast, and instructing a gain of the AGC amplifier of said read channel to a fixed gain at said start up, and setting the pull-in characteristic of said feedback circuit to a characteristic slower than the pull-in characteristic of the AGC amplifier of said read channel when said pull-in ends.

14. The read circuit according to claim 8, wherein said feedback circuit comprises:
a low pass filter for cutting a high frequency component of the output of said difference from said gain error computing unit; and
a gain multiplexer for multiplying the output of said low pass filter by a predetermined feedback gain, and controlling the gain of said differential amplifier.

15. A medium storage device, comprising:
a head for reading a medium;
a head IC for adjusting an amplitude level of a read signal from said head; and
a read channel which is connected to said IC and has an AGC amplifier, wherein said head IC comprises:
a differential amplifier for amplifying said read signal with a gain being set;

an envelope circuit for detecting an output amplitude level of said differential amplifier;

a gain error computing unit for computing a difference between said detected output amplitude level and a reference level;

a feedback circuit which has a pull-in characteristic that is slower than a pull-in characteristic of the AGC amplifier of said read channel, and automatically controls a gain of said differential amplifier according to a gain error amount which is said difference;

a peak hold circuit for holding a maximum value of said output amplitude level; and an amplitude limiting circuit for cutting an input of said output amplitude level which is smaller than said holding value of said peak hold circuit to said gain error computing unit according to said holding value, when said gain is initialized.

16. The medium storage device according to claim 15, wherein said amplitude limiting circuit comprises a switch for inputting said holding value of said peak hold circuit to said gain error computing unit when said gain is initialized, and inputting said detected output amplitude level of said envelope circuit to said gain error computing unit after said gain initialization is over.

17. The medium storage device according to claim 15, further comprising:

a comparison circuit for comparing a 1/N (N>1) value of said holding value of said peak hold circuit and said detected output amplitude level of said envelope circuit when said gain is initialized, wherein said amplitude limiting circuit comprises a switch for inputting said output amplitude level to said gain error computing unit if said output amplitude level is greater than said 1/N value.

18. The medium storage device according to claim 15, wherein said head IC further comprises:

a memory for storing an initial value of said adjusted gain; and a sequence circuit for setting an initial value of a gain of said memory to said differential amplifier when pull-in starts.

19. The medium storage device according to claim 18, further comprising a head switching section for connecting one of a plurality of heads to said differential amplifier according to a head select signal, wherein said memory stores initial values of gains of said plurality of heads, and said sequence circuit sets the initial value of the gain corresponding to said connected head of said memory in said differential amplifier when said pull-in starts.

20. The medium storage device according to claim 15, further comprising a sequence circuit for setting a pull-in characteristic of said feedback circuit to be fast, and instructing a gain of the AGC amplifier of said read channel to a fixed gain at said start up, and setting the pull-in characteristic of said feedback circuit to a characteristic slower than the pull-in characteristic of the AGC amplifier of said read channel when said pull-in ends.

* * * * *